United States Patent Office 2,947,754
Patented Aug. 2, 1960

2,947,754

SUBSTITUTED PYRIDONES

John V. Scudi, Springfield, David B. Reisner, Cedar Grove, and Scott J. Childress, Newark, N.J., assignors to Wallace & Tiernan Incorporated, Belleville, N.J., a corporation of Delaware No Drawing. Filed Nov. 12, 1958, Ser. No. 773,192

5 Claims. (Cl. 260—295.5)

This invention relates to a new group of pyridone derivatives:

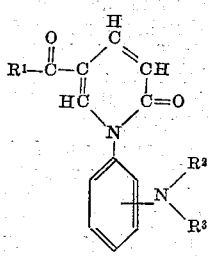

in which $R^1$ is hydroxyl, lower alkoxy, $NH_2$ or lower alkamine; and $R^2$ is H, lower alkyl, lower acyl; and $R^3$ is H or lower alkyl; and the non-toxic acids salts thereof.

These compounds and the non-toxic acid salts thereof are useful as sedatives, hypnotics, general anesthetics, muscle relaxants, ataractics, analgesics, or anti-convulsants.

The compounds are conveniently prepared from methyl coumalate by interaction with the amino group of an appropriately substituted aromatic compound. Such a reaction frequently induces ring-opening of the methyl coumalate and gives open-chain Schiff bases of the type:

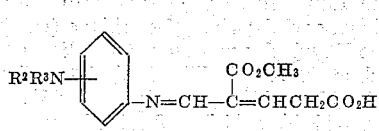

These Schiff bases can be cyclized by heating in basic solution such as aqueous sodium carbonate. When cyclization takes place, precipitation of the new compound occurs. If heating is continued too long, hydrolysis of the ester grouping may occur and the precipitated compound will redissolve. The acid can be then isolated by acidification. In such cases the carboxy compound can be converted to esters or amides using common procedures.

Compounds such as the carbomethoxy substituted pyridones which are obtained directly as described above can be converted to other useful compounds by such procedures as transesterification, ammonolysis, aminolysis, etc.

In these pyridones, the amino group can be subjected to further changes such as alkylation, acylation, etc. Conversely, acyl groups can be removed. It is, of course, possible to make substituted products directly from methyl coumalate and appropriately substituted aromatic diamines as will be more apparent in the examples to follow.

Some of the compounds of the present invention which have been made are set forth in the following table.

Table I

| Compound No. | $R^1$ | $R^2$ | $R^3$ | Position of $-NR^2R^3$ |
|---|---|---|---|---|
| 1 | HO— | H | H | meta. |
| 2 | $CH_3O$— | H | H | ortho. |
| 3 | $CH_3O$— | H | H | meta. |
| 4 | $CH_3O$— | H | H | para. |
| 5 | $CH_3O$— | $CH_3CO$— | H | ortho. |
| 6 | $CH_3O$— | $CH_3CO$— | H | meta. |
| 7 | $CH_3O$— | $CH_3CO$— | H | para. |
| 8 | $CH_3O$— | CHO— | H | meta. |
| 9 | $C_2H_5O$— | H | H | meta. |
| 10 | $n-C_3H_7O$— | H | H | meta. |
| 11 | $n-C_6H_{13}O$— | H | H | meta. |
| 12 | $NH_2$— | H | H | meta. |
| 13 | $n-C_4H_9NH$— | H | H | meta. |
| 14 | $CH_3O$— | $CH_3$ | H | meta. |
| 15 | HO— | $CH_3$ | $CH_3$ | meta. |
| 16 | $CH_3O$— | $CH_3$ | $CH_3$ | meta. |
| 17 | $i-C_3H_7O$— | $CH_3$ | $CH_3$ | meta. |
| 18 | $CH_3O$— | $C_2H_5$ | $C_2H_5$ | meta. |

*Example 1.*—A solution of 15 g. of o-amino acetanilide in 100 ml. of alcohol was mixed with a solution of 15.4 g. of methyl coumalate in 100 ml. of alcohol. After a few minutes, crystallization of a yellow solid occurred. This was filtered off. A small portion was recrystallized from methanol. The product α-(o-acetamidophenyliminomethyl) glutaconic acid, α-methyl-ester, melted at 154° C. (decomposed). *Analysis.*—Calculated for $C_{15}H_{16}O_5N_2$: N, 9.2%. Found: N, 9.0%.

The remaining crude solid was dissolved in 140 ml. of 10% sodium carbonate, heated to 40° C., cooled, and the solid which formed was filtered off and recrystallized from isopropyl alcohol. The white compound, 1-o-acetamidophenyl-5-carbomethoxy-2-pyridone (compound No. 5 of Table I), melted at 218–220° C. *Analysis.*—Calculated for $C_{15}H_{14}O_4N_2$: N, 9.8%. Found: N, 9.7%.

*Example 2.*—Solutions of 8.2 g. of m-aminoformanilide in 50 ml. of alcohol and 9.3 g. of methyl coumalate in 50 ml. of alcohol were mixed and the precipitated compound filtered off after an hour. A portion recrystallized from alcohol afforded α-(m-formamidophenyliminomethyl) glutaconic acid, α-methyl ester, M.P. 150° C. (decomposed). *Analysis.*—Calculated for $C_{14}H_{12}O_4N_2$: N, 9.6%. Found: N, 9.4%.

The remaining crude product was dissolved in 50 ml. of 18% sodium carbonate, heated to 70° C., cooled and filtered. Following recrystallization from methanol, the product, 1-m-formanidophenyl-5-carbomethoxy-2-pyridone (compound No. 8 of Table I), melted at 212–213.5° C. *Analysis.*—Calculated for $C_{14}H_{12}O_4N_2$: N, 10.3%. Found: N, 10.3%.

*Example 3.*—1-m-formamidophenyl-5-carbomethoxy-2-pyridone was hydrolyzed in dilute sulfuric acid to 1-m-aminophenyl-5-carboxy-2-pyridone (compound No. 1 of Table I). This acid melted at 273° C. (decomposed). *Analysis.*—Calculated for $C_{12}H_{10}O_3N_2$: N, 12.2%. Found: N, 12.1%.

A mixture of 37 g. of this acid and 150 g. of methanol was treated with hydrogen chloride until 11 g. had been absorbed. It was heated under reflux for 2 days, concentrated in vacuo, diluted with water, neutralized with sodium bicarbonate and filtered to afford crude 1-m-aminophenyl-5-carbomethoxy-2-pyridone (compound No. 3 of Table I. After recrystallization from methanol, it melted at 144–145° C. *Analysis.*—Calculated for $C_{13}H_{12}O_3N_2$: N, 11.5%. Found: N, 11.4%.

*Example 4.*—A solution of 36 g. of methyl coumalate in 150 ml. of alcohol was rapidly mixed into a solution of 24 g. of o-phenylenediamine. α-(o-Aminophenyliminomethyl)glutaconic acid, α-methyl ester, was filtered off. A portion recrystallized by concentration of an acetone solution, was found to melt at 123° C. (decomposed). *Analysis.*—Calculated for $C_{13}H_{14}O_4N_2$: N, 10.7%. Found: N, 10.7%.

Fifty grams of this crude product was dissolved in 500 ml. of 18% sodium carbonate and heated to 50° C. at which point an oil separated. After this had been cooled, it crystallized and was filtered off and recrystallized from acetone, giving 1-o-aminophenyl-5-carbomethoxy-2-pyridone (compound 2 of Table I), M.P. 152–153° C. *Analysis.*—Calculated for $C_{13}H_{12}O_3N_2$: N, 11.5%. Found: N, 11.4%.

*Example 5.*—In a manner similar to that described in Example 4, p-phenylenediamine was reacted with methyl coumalate. The intermediate anil, α-(p-aminophenyliminomethyl) glutaconic acid, α-methyl ester, melted at 120° C. (decomposed). *Analysis.*—Calculated for $C_{13}H_{14}O_4N_2$: N, 10.7%. Found: N, 10.3%.

By a procedure as described in Example 4, this material was converted to 1-p-aminophenyl-5-carbomethoxy-2-pyridone (compound No. 4 of Table I), which melted at 206–208° C. *Analysis.*—Calculated for $C_{13}H_{12}O_3N_2$: N, 11.5%. Found: N, 11.4%.

*Example 6.*—Following the procedure of Example 4, m-phenylenediamine was reacted with methyl coumalate. The intermediate anil, α-(m-aminophenyliminomethyl) glutaconic acid, α-methyl ester, melted at 131° C. (decomposed). *Analysis.*—Calculated for $C_{13}H_{14}O_4N_2$: N, 10.7%. Found: N, 10.4%.

Again, by the procedure described in Example 4, this material was converted to 1-m-aminophenyl-5-carbomethoxy-2-pyridone (compound No. 3 of Table I) which melted at 144–145° C. and was identical with the material prepared as set forth in Example 3.

*Example 7.*—7.5 g. of 1-p-aminophenyl-5-carbomethoxy-2-pyridone (compound 4 of Table I), was placed in 20 g. of acetic acid and 6 g. of acetic anhydride. The mixture was heated to a boil, cooled, diluted with water and filtered. The product was recrystallized from isopropyl alcohol, affording 1-p-acetamidophenyl-5-carbomethoxy-2-pyridone (compound No. 7 of Table I), M.P. 229–231° C. *Analysis.*—Calculated for $C_{15}H_{14}O_4N_2$: N, 9.8%. Found: N, 9.8%.

*Example 8.*—Exactly as set out in Example 7, 1-m-actamidophenyl-5-carbomethoxy-2-pyridone (compound No. 6 of Table I), M.P. 194–196° C., was prepared from 1-m-aminophenyl-5-carbomethoxy-2-pyridone (compound 3 of Table I). *Analysis.*—Calculated for $C_{15}H_{14}O_4N_2$: N, 9.8%. Found: N, 9.6%.

*Example 9.*—A solution of 18.3 g. of N-methyl-m-phenylenediamine in 100 ml. of methanol was treated with a solution of 23.1 g. of methyl coumalate in 200 ml. of methanol. The precipitated anil was filtered off after 10 minutes. A portion, recrystallized from methanol, afforded yellow crystals of α-(m-methylaminophenyliminomethyl) glutaconic acid, α-methyl ester, M.P. 127° C. (decomposed). *Analysis.*—Calculated for $C_{14}H_{16}O_4N_2$: N, 10.1%. Found: N, 10.0%.

Cyclization of the anil was brought about by heating in 200 ml. of 20% sodium carbonate to 70° C. The product which separated was recrystallized from acetone, giving 1-m-methylaminophenyl-5-carbomethoxy-2-pyridone (compound No. 14 of Table I), M.P. 135–137° C. *Analysis.*—Calculated for $C_{14}H_{14}O_3N_2$: N, 10.8%. Found: N, 10.6%.

*Example 10.*—In a manner similar to that used in Example 9, N,N-dimethyl-m-phenylenediamine was reacted with methyl coumalate. The intermediate anil, α-(m-dimethylaminophenyliminomethyl) glutaconic acid, α-methyl ester, melted at 135° C. (decomposed). *Analysis.*—Calculated for $C_{15}H_{18}O_4N_2$: N, 9.6%. Found: N, 9.7%.

The procedure set out in Example 9 was followed to convert this material to 1-m-dimethylaminophenyl-5-carbomethoxy-2-pyridone (compound No. 16 of Table I), which, when recrystallized from 10% alcohol, had a melting point of 99–101° C. It then resolidified and remelted at 115–117° C. *Analysis.*—Calculated for $C_{15}H_{16}O_3N_2$: N, 10.3%. Found: N, 10.4%.

*Example 11.*—Two grams of 1-m-aminophenyl-5-carbomethoxy-2-pyridone (compound No. 3 of Table I), was dissolved in methanol and treated with alcoholic hydrogen chloride until the solution became rather strongly acid. Ether was added and 1-m-aminophenyl-5-carbomethoxy-2-pyridone hydrochloride (the HCl acid salt of compound No. 3 of Table I) crystallized. It could be recrystallized from methanol by adding ether. It melted at 239° C. (decomposed). *Analysis.*—Calculated for $C_{13}H_{12}O_3N_2$: N, 10.0%. Found: N, 9.9%.

*Example 12.*—1-m-aminophenyl-5-carboxy-2-pyridone (compound No. 1 of Table I), was prepared by hydrolysis of 1-m-aminophenyl - 5 - carbomethoxy - 2 - pyridone (compound No. 3 of Table I), in dilute sodium hydroxide. Following recrystallization from alcohol, it melted at 273° C. (decomposed), identical with the material prepared in Example 3.

Thirty-three grams of this acid was heated in 500 ml. of ethanol containing 15 g. of hydrogen chloride until solution was complete (about 2 days). The solvent was concentrated in vacuo and the residue diluted with water and neutralized. 1-m-aminophenyl-5-carbethoxy-2-pyridone (compound No. 9 of Table I), slowly crystallized. After recrystallization from aqueous alcohol, it melted at 103–104° C. *Analysis.*—Calculated for $C_{14}H_{14}O_3N_2$: N, 10.8%. Found: N, 10.8%.

*Example 13.*—Twenty grams of 1-m-aminophenyl-5-carbomethoxy-2-pyridone (compound No. 3 of Table I), was added to 150 ml. of dry n-propanol in which a small amount of sodium had been dissolved. The solution was refluxed for an hour, then slowly distilled to leave a residue of 40 ml. This was cooled and the product crystallized. It was filtered, washed, and twice recrystallized from methanol to afford 1-m-aminophenyl-5-carbopropoxy-2-pyridone (compound No. 10 of Table I), M.P. 117–119° C. *Analysis.*—Calculated for $C_{15}H_{16}O_3N_2$: N, 10.3%. Found: N, 10.1%.

*Example 14.*—By operating substantially as described in Example 13, 1-m-aminophenyl-5-carbohexoxy-2-pyridone (compound No. 11 of Table I), M.P. 91–92.5° C., was prepared, using n-hexanol instead of n-propanol. *Analysis.*—Calculated for $C_{18}H_{22}O_3N_2$: N, 8.9%. Found: N, 8.9%.

*Example 15.*—1-m-dimethylaminophenyl-5-carbomethoxy-2-pyridone (compound No. 16 of Table I) was hydrolyzed in dilute sodium hydroxide to afford 1-m-dimethylaminophenyl-5-carboxy-2-pyridone (compound No. 15 of Table I), which upon recrystallization from methanol melted at 252–254° C. *Analysis.*—Calculated for $C_{14}H_{14}O_3N_2$: N, 10.8%. Found: N, 10.8%.

Ten grams of this acid in 200 ml. of isopropyl alcohol was treated with 15 g. of dry hydrogen chloride and the resultant suspension heated under reflux for 10 hours at which point solution had become complete. The solvent was concentrated in vacuo, the residue diluted with water and treated with sodium bicarbonate. The product, 1-m-dimethylaminophenyl-5-carbisopropoxy-2-pyridone (compound No. 17 of Table I), proved to be oily. It was extracted into ether, which was dried and evaporated. *Analysis.*—Calculated for $C_{17}H_{20}O_3N_2$: N, 9.3%. Found: N, 9.3%.

A portion of this compound (No. 17 aforesaid) was converted to the picrate for characterization. It melted at 175–177° C. (from aqueous alcohol). *Analysis.*—Calculated for $C_{23}H_{24}O_{10}N_5$: N, 13.2%. Found: N, 13.1%.

*Example 16.*—A solution of 11.5 g. of 1-m-aminophenyl-5-carbomethoxy-2-pyridone (compound No. 3 of Table I), in 125 ml. of methanol was mixed with 115 ml. of concentrated ammonium hydroxide. After standing for 5 days, the solution was concentrated, chilled and filtered. The product, 1-m-aminophenyl-5-carbamyl-2-pyridone (compound No. 12 of Table I), was recrystallized from water and was found to melt at 249–250° C.

*Analysis.*—Calculated for $C_{12}H_{11}O_2N_3$: N, 18.3%. Found: N, 18.4%.

*Example 17.*—Ten grams of 1-m-aminophenyl-5-carbomethoxy-2-pyridone (compound No. 3 of Table I), was placed in 15 g. of n-butylamine and the mixture refluxed for 24 hours. It was then cooled, diluted with ether and the product separated. Recrystallization from alcohol gave 1-m-aminophenyl-5-butylcarbamyl-2-pyridone (compound No. 13 of Table I), M.P. 227–229° C. *Analysis.*—Calculated for $C_{16}H_{19}O_2N_3$: N, 14.7%. Found: N, 14.6%.

*Example 18.*—In a manner similar to that used in Example 9, N,N-diethyl-m-phenylenediamine was reacted with methyl coumalate. The intermediate anil, α-(m-diethylaminophenyliminomethyl) glutaconic acid, α-methyl ester, melted with decomposition at 104.5–105° C. *Analysis.*—Calculated for $C_{17}H_{21}O_4N_2$: N, 8.9%. Found: N, 8.6%.

The procedure set out in Example 9 was followed to convert this material to 1-m-diethylaminophenyl-5-carbomethoxy-2-pyridone (compound No. 18 of Table I), which, when recrystallized from aqueous methanol, melted at 111–112° C. *Analysis.*—Calculated for $C_{17}H_{20}O_3N_2$: N, 9.3%. Found: N, 9.3%.

*Example 19.*—One gram of 1-o-acetamidophenyl-5-carbomethoxy-2-pyridone (compound No. 5 of Table I), in 10 ml. of methanol containing 0.5 g. of hydrogen chloride was heated overnight under reflux. The solvent was removed in vacuo and the residue treated with dilute ammonium hydroxide. The material so obtained was recrystallized from acetone and was found to be identical with 1-o-aminophenyl-5-carbomethoxy-2-pyridone (compound No. 2 of Table I), prepared according to Example 4.

While but a limited number of examples of the classes of compounds herein claimed are specifically set out hereinabove, these examples are adequate to demonstrate the various compounds coming within the scope of the present invention. The invention is, therefore, intended to be construed in accordance with the appended claims.

What is claimed is:

1. A compound of the group consisting of pyridone compounds having the formula:

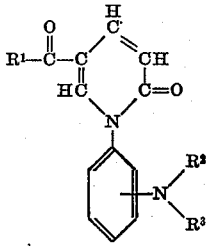

in which $R^1$ is selected from the group consisting of hydroxy, lower alkoxy, $NH_2$, and lower alkamine; $R^2$ is selected from the group consisting of hydrogen, lower alkyl, and lower alkanoic acid acyl; and $R^3$ is selected from the group consisting of hydrogen and lower alkyl; and the non-toxic acid salts of these pyridone compounds.

2. The compound, 1-m-aminophenyl-5-carbomethoxy-2-pyridone, having the formula:

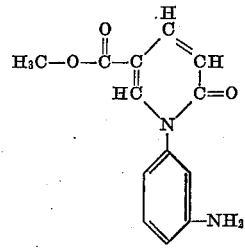

3. The compound, 1-m-dimethylaminophenyl-5-carbomethoxy-2-pyridone, having the formula:

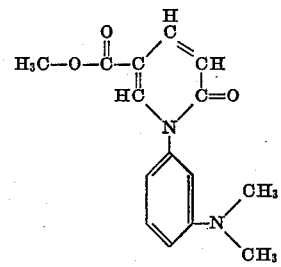

4. The compound, 1-m-aminophenyl-5-carbethoxy-2-pyridone, having the formula:

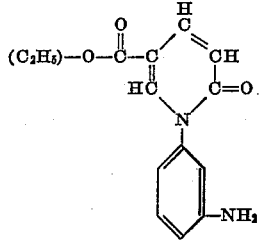

5. The compound, 1-m-formamidophenyl-5-carbomethoxy-2-pyridone, having the formula:

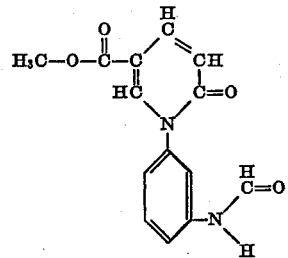

No references cited.